US012571187B2

(12) United States Patent
Kim et al.

(10) Patent No.: US 12,571,187 B2
(45) Date of Patent: Mar. 10, 2026

(54) CONSTRUCTION MACHINERY SYSTEM USING Li-Fi TECHNOLOGY

(71) Applicant: HD HYUNDAI INFRACORE CO., LTD., Dong-gu (KR)

(72) Inventors: Hansol Kim, Bupyeong-gu (KR); Seongho Song, Dong-gu (KR)

(73) Assignee: HD HYUNDAI INFRACORE CO., LTD., Dong-Gu (KR)

( * ) Notice: Subject to any disclaimer, the term of this patent is extended or adjusted under 35 U.S.C. 154(b) by 120 days.

(21) Appl. No.: 18/294,017

(22) PCT Filed: Aug. 9, 2022

(86) PCT No.: PCT/KR2022/011833
§ 371 (c)(1),
(2) Date: Jan. 31, 2024

(87) PCT Pub. No.: WO2023/018169
PCT Pub. Date: Feb. 16, 2023

(65) Prior Publication Data
US 2024/0337093 A1      Oct. 10, 2024

(30) Foreign Application Priority Data

Aug. 10, 2021    (KR) ........................ 10-2021-0105696

(51) Int. Cl.
*G01S 19/42* (2010.01)
*E02F 9/26* (2006.01)
*G01S 19/48* (2010.01)
(52) U.S. Cl.
CPC ............ *E02F 9/264* (2013.01); *G01S 19/485* (2020.05)

(58) Field of Classification Search
USPC ................................ 701/29.1, 32.3, 32.4, 50
See application file for complete search history.

(56) References Cited

U.S. PATENT DOCUMENTS

| | | | | |
|---|---|---|---|---|
| 11,293,758 B2* | 4/2022 | Hamilton | ............... | G08G 1/017 |
| 2014/0200863 A1* | 7/2014 | Kamat | ................... | E02F 9/245 |
| | | | | 703/1 |

(Continued)

FOREIGN PATENT DOCUMENTS

| | | |
|---|---|---|
| JP | 2008248653 A | 10/2008 |
| JP | 2020183696 A | 11/2020 |

(Continued)

OTHER PUBLICATIONS

International Search Report for related International Application No. PCT/KR2022/011833; report dated Feb. 16, 2023; (3 pages).

(Continued)

*Primary Examiner* — Jonathan L Sample
(74) *Attorney, Agent, or Firm* — K&L Gates LLP

(57) ABSTRACT

A construction machinery system using Li-Fi technology, according to an embodiment of the present disclosure, comprises an LED module unit, a Li-Fi signal reception unit, and a control unit. Each of a plurality of LED module units is arranged in an area in which a GPS signal is not received, and generates and transmits a Li-Fi signal. The Li-Fi signal reception unit is arranged in construction machinery and receives a Li-Fi signal. The control unit is arranged in the construction machinery and calculates the location of the construction machinery by using a Li-Fi signal.

13 Claims, 6 Drawing Sheets

(56)                    References Cited

U.S. PATENT DOCUMENTS

| | | | | |
|---|---|---|---|---|
| 2018/0335524 A1* | 11/2018 | Youssef | ................. | G01S 19/22 |
| 2020/0132473 A1* | 4/2020 | Shipley | ............. | G01C 21/1652 |
| 2020/0370890 A1* | 11/2020 | Hamilton | ................ | G08G 1/04 |
| 2022/0176873 A1* | 6/2022 | Demski | ................. | B62D 33/06 |

FOREIGN PATENT DOCUMENTS

| | | |
|---|---|---|
| KR | 20020085663 A | 11/2002 |
| KR | 100723680 B1 | 5/2007 |
| KR | 1020170114831 A | 10/2017 |
| KR | 20180107131 A | 10/2018 |

OTHER PUBLICATIONS

Written Opinion for related International Application No. PCT/KR2022/011833; report dated Feb. 16, 2023; (4 pages).

\* cited by examiner

SENSOR UNIT 40

BODY IMU SENSOR 41
BOOM IMU SENSOR 42
ARM IMU SENSOR 43
BUCKET IMU SENSOR 44

20a 20b 20c 20d

Li-Fi RECEIVER 30

GPS SATELLITE

GPS RECEIVER 10

OUTSIDE

INSIDE

60

50

*20: 20a, 20b, 20c, 20d

CONSTRUCTION MACHINERY SYSTEM USING Li-Fi TECHNOLOGY

CROSS-REFERENCE TO RELATED APPLICATIONS

This application is the National Stage filing under 35 U.S.C. 371 of International Application No. PCT/KR2022/011833, filed on Aug. 9, 2022, which claims the benefit of earlier filing date of and right of priority to Korean Application No. 10-2021-0105696 filed on Aug. 10, 2021, the contents of which are all hereby incorporated by reference herein in their entirety.

FIELD

The present disclosure relates to a construction machinery system, and, more particularly, to a construction machinery system using Li-Fi technology to measure the location of a construction machine using GPS signals and visible light from a light-emitting diode (LED).

BACKGROUND

A positioning system refers to a surveying system for determining the location of points of interest, and is divided into technology for measuring the location of an object using satellites, such as the global positioning system (GPS), and technology for measuring the location of an object based on the strength of signals, such as the wireless local area network (WLAN), the wideband code division multiple access (WCDMA), the radio frequency identification (RFID), and the ultra wide band (UWB).

However, in the case of the GPS technology for determining the location or the movement of an object using satellites indoors, in the basement, in tunnels, etc., due to limitations in measurement by satellites, the accuracy of the measured position of an object may decrease, or it may be impossible to measure the position of the object.

In addition, in the case of the technology for measuring the location of an object based on the strength of signals, such as the WLAN, the WCDMA, the RFID, and the UWB, new infrastructure needs to be built indoors, in the basement, in tunnels, etc., and it is difficult to obtain precise location information in centimeter units due to signal interference or disturbance.

RELATED ART LITERATURE (Patent Literature 1) Korean Patent No. 10-0723680 (May 30, 2007)

SUMMARY

In order to solve the above-mentioned problems, the present disclosure is aimed at providing a construction machinery system using Li-Fi technology to accurately measure the location of construction machinery placed in areas where no GPS signals are received due to interference, disturbance, etc.

However, the problems to be resolved by the present disclosure are not limited to the above-mentioned problems, and may be expanded in various ways within the technology and the scope of the present disclosure.

A construction machinery system using Li-Fi technology according to an embodiment of the present disclosure may include a GPS signal reception unit, LED module units, a Li-Fi signal reception unit, a sensor unit, and a control unit. The GPS signal reception unit may be disposed at a first location to receive GPS signals sent from GPS satellites and generate GPS coordinates, each of the plurality of LED module units may be disposed at a second location separate from the GPS signal reception unit and receive the GPS signals to generate and transmit Li-Fi signals, the Li-Fi signal reception unit may be disposed on a construction machine and receive the Li-Fi signals, the sensor unit may be disposed on the construction machine and measure the angles of components of the construction machine, and the control unit may calculate the positions of the construction machine and the components based on the Li-Fi signals and the angles of the components.

According to an embodiment of the present disclosure, the LED module unit may include a Li-Fi signal generator that generates the Li-Fi signals and a light emitting diode (LED) that is electrically connected to the Li-Fi signal generator and transmits the Li-Fi signals.

According to an embodiment of the present disclosure, the LED module unit may further include an input unit: into the input unit, the GPS and positioning coordinates of the GPS signal reception unit, the unique identification mark (ID) of the LED module unit, the positioning coordinates of the LED module unit, and the illumination and the time of the LED module unit may be input: the positioning coordinates of the GPS signal reception unit may be coordinates for indicating the location of the GPS signal reception unit using the point where the GPS signal reception unit is placed as a reference point; and the positioning coordinates of the LED module unit may be coordinates for indicating the location of the LED module unit using the point where the GPS signal reception unit is placed as a reference point.

According to an embodiment of the present disclosure, the Li-Fi signals may be generated in one frame unit, and the one frame unit may include data on the GPS and positioning coordinates of the GPS signal reception unit, the unique identification mark (ID) of the LED module unit, the positioning coordinates of the LED module unit, and the illuminance and the time of the LED module unit.

According to an embodiment of the present disclosure, the LED module unit may include the LED that transmits the Li-Fi signals, and the LED may continuously transmit the Li-Fi signals over time.

According to an embodiment of the present disclosure, the control unit may calculate the positioning coordinates of the Li-Fi signal reception unit based on the positioning coordinates of the LED module unit and the distance between the LED module unit and the Li-Fi signal reception unit, and the positioning coordinates of the Li-Fi signal reception unit may be coordinates for indicating the location of the Li-Fi signal reception unit using the point where the GPS signal reception unit is placed as a reference point.

According to an embodiment of the present disclosure, the control unit may calculate the GPS coordinates of the Li-Fi signal reception unit by adding the GPS coordinates of the GPS signal reception unit to the positioning coordinates of the Li-Fi signal reception unit.

According to an embodiment of the present disclosure, the sensor unit may be a sensor for measuring an angle, the construction machine may be an excavator, and the sensor unit may measure the angles of the main body, the boom, the arm, and the bucket of the excavator.

According to an embodiment of the present disclosure, the control unit may analyze the Li-Fi signals to calculate the location of the excavator, and calculate the position of the end of the bucket based on sensor values of the sensor unit disposed on the main body, the boom, the arm, and the bucket of the excavator.

The construction machinery system based on Li-Fi technology according to an embodiment of the present disclosure may further include a display unit that displays the position of the excavator and the position of the end of the bucket.

According to an embodiment of the present disclosure, the display unit may display the plurality of LED module units.

The construction machinery system based on Li-Fi technology according to an embodiment of the present disclosure may further include a map data storage unit including a working drawing of the second location. The display unit may display the working drawing.

According to an embodiment of the present disclosure, the display unit may separately display the working drawing of the first location and the working drawing of the second location.

Through the construction machinery system using Li-Fi technology according to an embodiment of the present disclosure, it may be possible to accurately measure the location of construction equipment placed in areas where no GPS signals are received.

Since there is no need for regular surveying, there is no need for a surveyor to be on standby at all times.

Even in areas where no GPS signals are received, it may be possible to check the status of work being done by construction equipment in real time.

As a result, the working time may be shortened.

However, the effect of the present disclosure is not limited to the above-mentioned effects, and may be expanded in various ways within the technology and the scope of the present disclosure.

DETAILED DESCRIPTION

Figure 1:
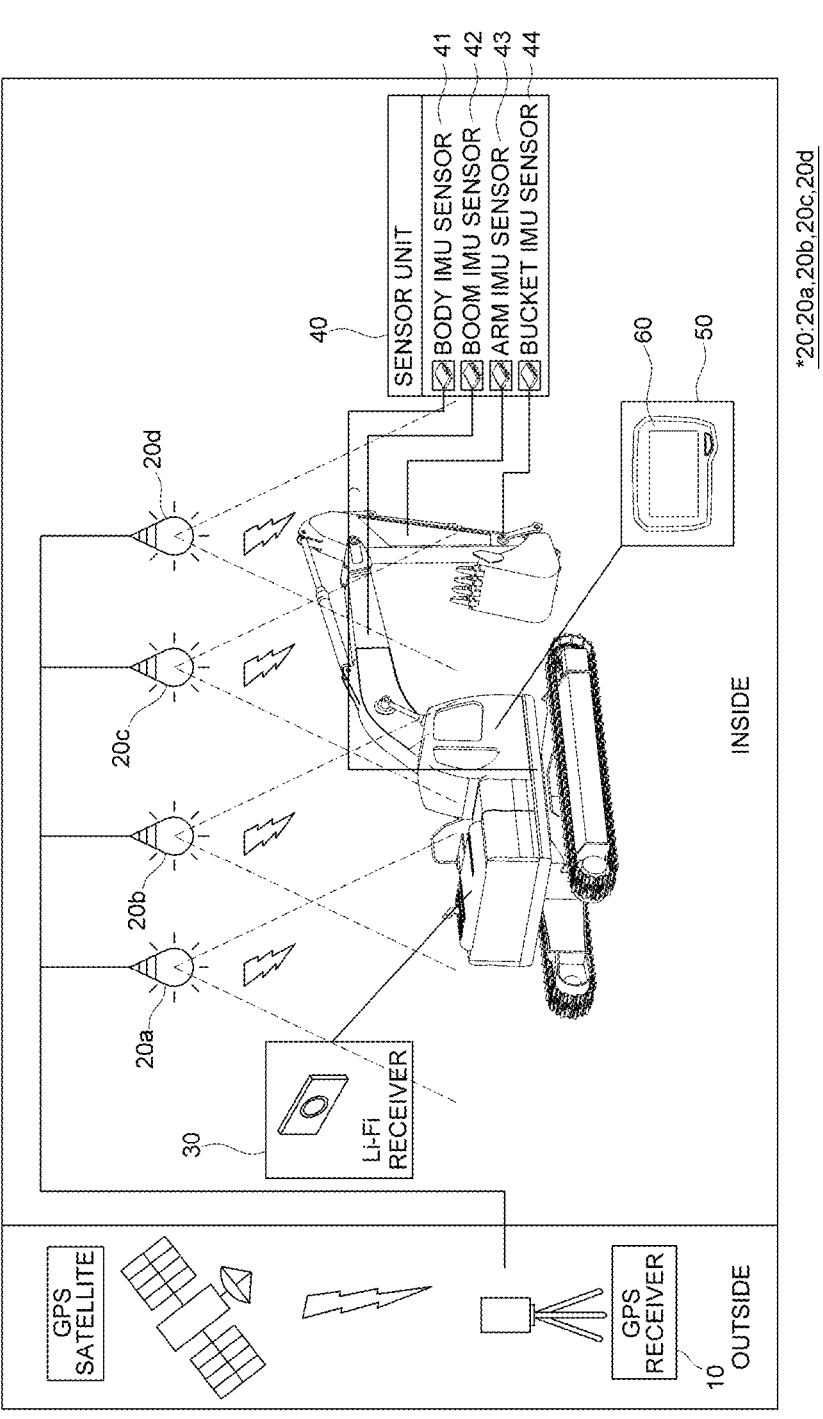
FIG. 1 is a view schematically showing a construction machinery system using Li-Fi technology according to an embodiment of the present disclosure.

Hereinafter, the embodiments of the present disclosure will be described in more detail with reference to the attached drawings. Among the components of the present disclosure, detailed descriptions of those that can be clearly understood and easily reproduced by a person having ordinary skill in the art according to the related art will not be provided in order not to obscure the gist of the present disclosure.

In addition, the thickness or the size of each component shown in the drawings has been exaggerated, omitted, or schematically shown for convenience and clarity of explanation. Furthermore, the size of each component does not entirely reflect the actual size.

Hereinafter, a construction machinery system using the light fidelity (Li-Fi) technology according to an embodiment of the present disclosure will be described.

The Li-Fi technology is a visible light wireless communication (VLC) technology for exchanging data using the wavelength of light emitted from a light emitting diode (LED). The Li-Fi can be used anywhere there is lighting, is harmless to the human body, and is inexpensive. In addition, when using the Li-Fi, communication is possible even at LED illumination levels that cannot be seen with the naked eye, and there are no problems such as frequency crosstalk.

Using the Li-Fi technology, it may be possible to measure the location of construction equipment accurately even when the equipment is being operated in a place where GPS signals are not properly received.

Figure 2:
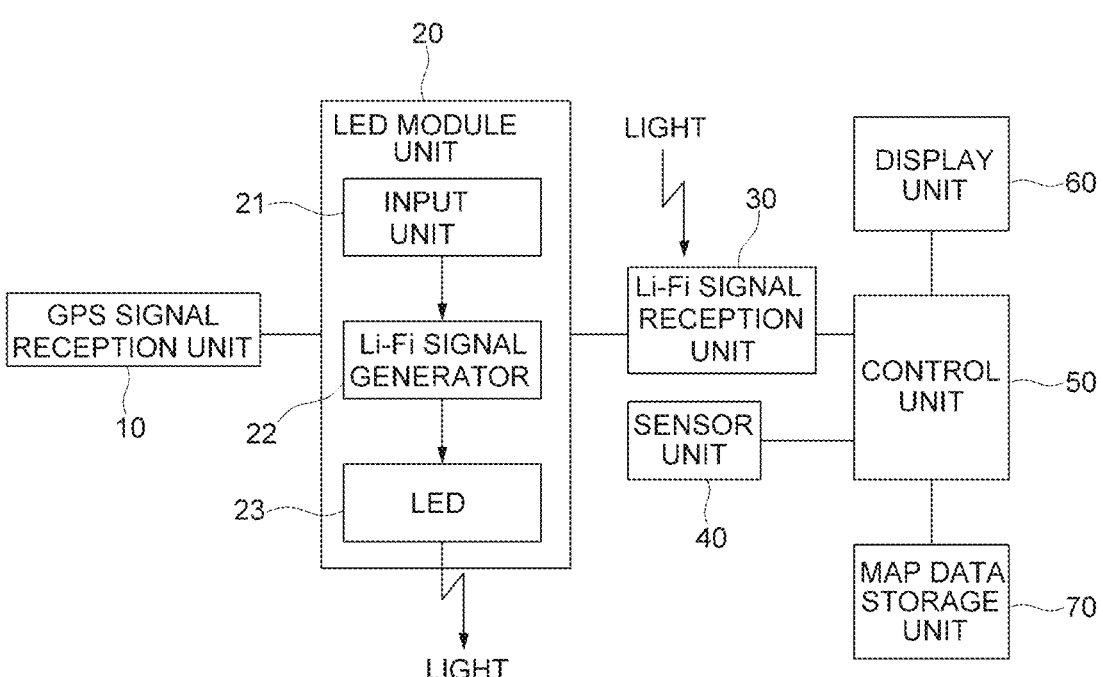
FIG. 2 is a block diagram schematically showing the construction machinery system using Li-Fi technology according to an embodiment of the present disclosure.

FIG. 1 is a view schematically showing a construction machinery system using Li-Fi technology according to an embodiment of the present disclosure, and FIG. 2 is a block diagram schematically showing the construction machinery system using Li-Fi technology according to an embodiment of the present disclosure.

Referring to FIGS. 1 and 2, the construction machinery system using Li-Fi technology according to an embodiment of the present disclosure may include a GPS signal reception unit 10, an LED module unit 20, and a Li-Fi signal reception unit 30, a sensor unit 40, a control unit 50, and a display unit 60.

The GPS signal reception unit 10 may receive global positioning system (GPS) signals. The GPS receiver in FIG. 1 refers to the GPS signal reception unit 10.

Generally, the GPS refers to a satellite navigation system for calculating the current location of an object by receiving signals sent from GPS satellites, and is used for navigation devices of aircraft, ships, automobiles, etc. and for smartphones, tablet computers, etc.

The GPS signal reception unit 10 may receive GPS signals sent from GPS satellites and generate its own GPS coordinates.

Due to limitations in measurement using GPS satellites, GPS signals may not be received smoothly indoors, in the basement, in tunnels, etc. Therefore, in the present disclosure, areas where GPS signals are not smoothly received due to limitations in measurement using GPS satellites are collectively referred to as "areas where no GPS signals are received."

The GPS signal reception unit 10 should not be placed in an area where no GPS signals are received, but in an area where GPS signals are smoothly received. The GPS signal reception unit 10 may be placed at a first location, and the first location refers to the inside or the outside of a construction machine.

Figure 3:
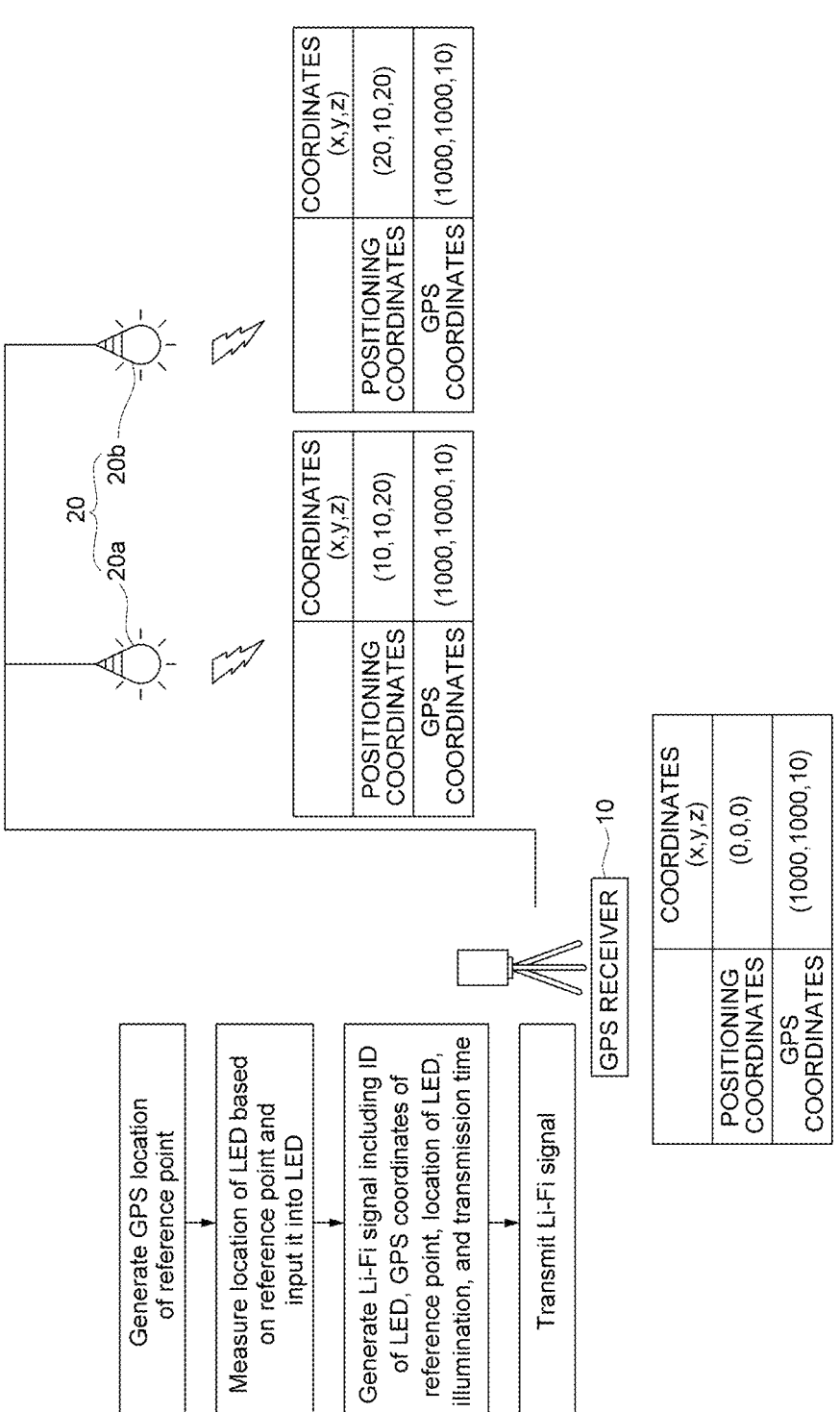
FIG. 3 is a view for specifically illustrating the LED module unit in FIG. 2.

FIG. 3 is a view for specifically illustrating the LED module unit in FIG. 2.

Referring to FIGS. 1 to 3, the LED module unit 20 may generate a Li-Fi signal using input information and transmit a Li-Fi signal using light from an LED.

The LED module unit 20 may be placed at a second location separate from the GPS signal reception unit. The second location may be an area where no GPS signals are received.

A plurality of LED module units 20 may be placed in an area where no GPS signals are received. In FIG. 1, four LED module units 20 are placed in an area where no GPS signals are received, and in FIG. 3, two LED module units 20 are placed in an area where no GPS signals are received.

When a plurality of LED module units 20 are arranged, they may be electrically connected to each other.

The LED module unit 20 may include an input unit 21, a Li-Fi signal generator 22, and a light emitting diode (LED) 23.

Into the input unit 21, the GPS and positioning coordinates of the GPS signal reception unit 10, the unique identification mark, i.e., a type of identification (ID) of the LED module unit 20, the installation or positioning coordinates of the LED module unit 20, and the illumination and the time of the LED module unit 20 may be input. Here, the GPS coordinates and the positioning coordinates may be x, y, z coordinates. The positioning coordinates may be defined as coordinates for displaying the location of an object using the point where the GPS signal reception unit 10 is placed as a reference point. Since the point where the GPS signal reception unit 10 is placed may be the reference point for the positioning coordinates, the positioning coordinates of the GPS signal reception unit 10 may be (0,0,0).

The GPS coordinates of the GPS signal reception unit 10 may refer to the GPS coordinate values of the GPS signal reception unit 10 generated by the GPS signal reception unit 10 receiving GPS signals sent from GPS satellites.

It may be possible for a user to input the GPS coordinates of the GPS signal reception unit 10 into the input unit 21.

In FIG. 3, generating the GPS location of the reference point may correspond to generating the positioning coordinates of the GPS signal reception unit 10.

A user may set the location where the GPS signal reception unit 10 is placed as a reference point, and set the coordinate value of the reference point as the positioning coordinate value of the GPS signal reception unit 10. The user may set the coordinate value of the reference point as (0,0,0) and input it into the input unit 21.

A user may create a unique identification mark (ID) of the LED module unit 20 and input it into the input unit 21. When there are a plurality of LED module units 20, the user may generate a unique identification mark (ID) for each of the LED module units 20 and input it into the input unit 21.

The unique identification mark (ID) of the LED module unit 20 may be generated or determined by listing letters, numbers, symbols, etc.

The installation or positioning coordinates of the LED module unit 20 may refer to the coordinate value of the location where the LED module unit 20 is installed. The installation or positioning coordinates of the LED module unit 20 may be coordinates for indicating the location of the LED module unit 20 using the point where the GPS signal reception unit 10 is placed as a reference point. This may be measured by surveying based on the coordinate value of the reference point (e.g., (0,0,0)).

A user may input the installation or positioning coordinates of the LED module unit 20 into the input unit 21. When there are a plurality of LED module units 20, the user may obtain the installation or positioning coordinates of each of the LED module units 20 by surveying and then input them into the input unit 21.

Specifically, the illuminance of the LED module unit 20 may refer to the illuminance of the LED 23 included in the LED module unit 20.

A user may measure the illuminance of the LED 23 at a reference distance (e.g., 1 m) before the LED module unit 20 is placed in an area where no GPS signals are received, and input the measured illuminance value into the input unit 21. When there are a plurality of LED module units 20, the user may measure the illuminance of each of the LED module units 20, specifically, of the LEDs 23 and input it into the input unit 21.

A user may input time into the input unit 21 of the LED module unit 20. The time input to the input unit 21 of the LED module unit 20 may be synchronized with the time of the GPS signal reception unit 10.

The input unit 21 may be electrically connected to the Li-Fi signal generator 22. Data input to the input unit 21 may be transmitted to the Li-Fi signal generator 22.

The Li-Fi signal generator 22 may generate Li-Fi signals.

The Li-Fi signal generator 22 may generate Li-Fi signals based on the Li-Fi technology.

The Li-Fi signal generator 22 may generate a Li-Fi signal by using the GPS and positioning coordinates of the GPS signal reception unit 10, the unique identification mark (ID) of the LED module unit 20, the installation or positioning coordinates of the LED module unit 20, and the illuminance and the time of the LED module unit 20, which have been input to the input unit 21, in one frame unit.

That is, the Li-Fi signal generated by the Li-Fi signal generator 22 may be generated in one frame unit, and may include data on the GPS and positioning coordinates of the GPS signal reception unit 10, the unique identification mark (ID) of the LED module unit 20, the installation or positioning coordinates of the LED module unit 20, and the illuminance and the time of the LED module unit 20, which have been input to the input unit 21.

The Li-Fi signal generator 22 of the LED module unit 20 may continuously generate Li-Fi signals over time. That is, the Li-Fi signal generator 22 of the LED module unit 20 may continuously generate data in one frame unit over time.

When there are a plurality of LED module units 20, the Li-Fi signal generator 22 of each of the LED module units 20 may continue to generate a Li-Fi signal or data in one frame unit over time.

The Li-Fi signal generator 22 may be electrically connected to the LED 23.

A Li-Fi signal or data in one frame unit, generated by the Li-Fi signal generator 22, may be transmitted to the LED 23.

A Li-Fi signal or data in one frame unit, generated by the Li-Fi signal generator 22, may be transmitted using light from the LED 23. In other words, the LED 23 may continuously transmit a Li-Fi signal or data in one frame unit, generated by the Li-Fi signal generator 22, over time using light. Here, the time of the LED module unit 20 among the data in one frame unit may refer to the transmission time during which the LED 23 transmits the data in one frame unit.

The LED module unit 20 may include a support board (PCB) and a plurality of components mounted on the support board. The plurality of components may include an input terminal serving as the input unit 21, a memory chip for storing input data, etc., but are not limited thereto.

Referring to FIG. 2, the construction machinery system using Li-Fi technology according to an embodiment of the present disclosure may include a map data storage unit 70 including a working drawing of the first location where the GPS signal reception unit 10 is placed and a working drawing of the second location where the LED module unit 20 is placed.

Figure 4:
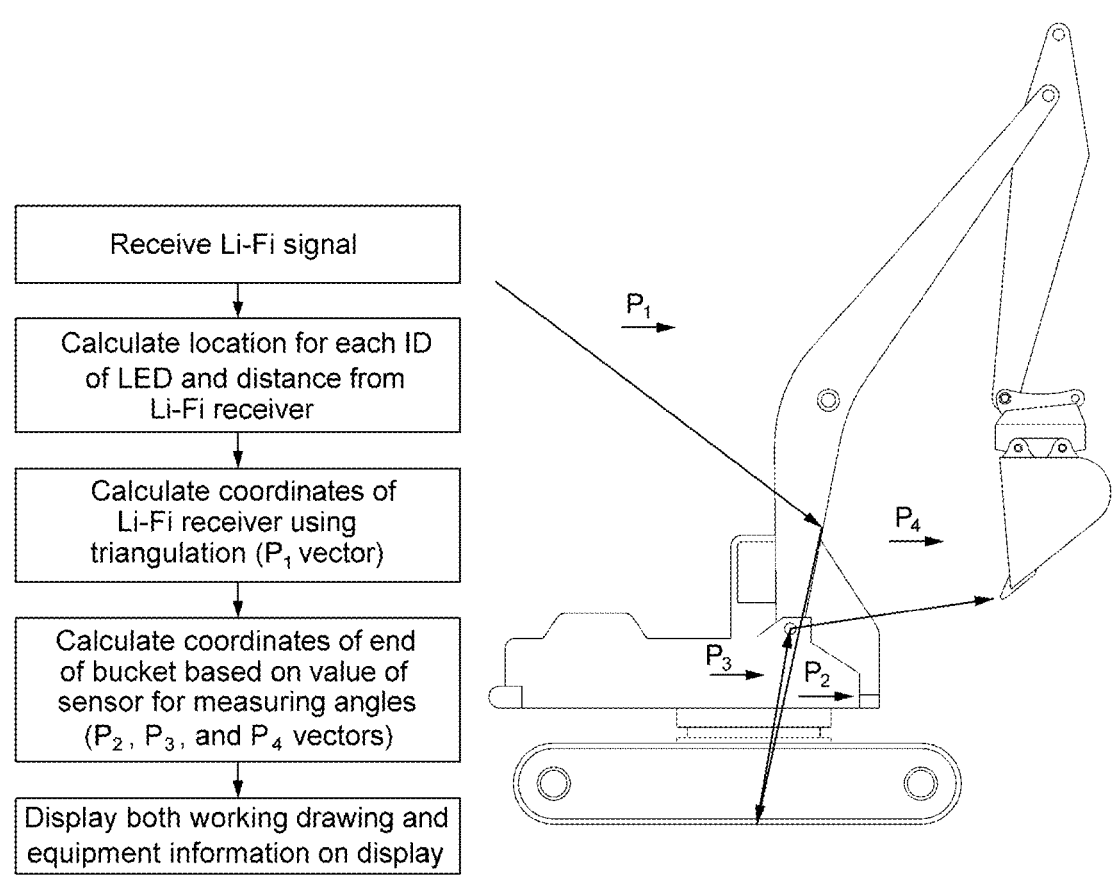
FIG. 4 is a view showing the procedure for calculating the location of a construction machine using Li-Fi signals.
Figure 5:
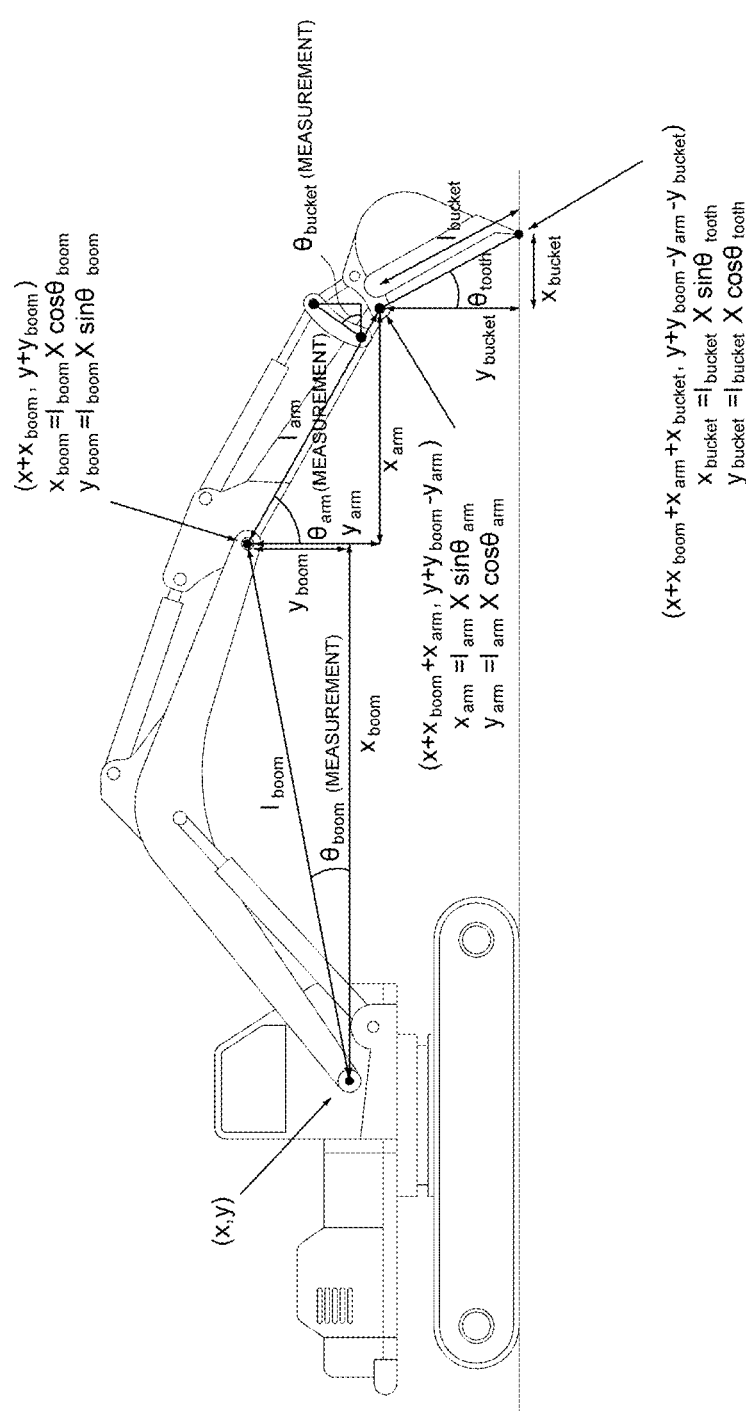
FIG. 5 is a view showing the process of calculating coordinates for the position of each component of a construction machine, e.g., an excavator, using the sensor unit.

FIG. 4 is a view showing the procedure for calculating the location of a construction machine using Li-Fi signals, and FIG. 5 is a view showing the process of calculating coordinates for the position of each component of a construction machine, e.g., an excavator, using the sensor unit.

Referring to FIGS. 1 to 5, the construction machinery system using Li-Fi technology according to an embodiment of the present disclosure may include the Li-Fi signal reception unit 30, the sensor unit 40, the control unit 50, and the display unit 60. The Li-Fi signal reception unit 30, the sensor unit 40, the control unit 50, and the display unit 60 may be disposed on a construction machine.

The construction machinery system using Li-Fi technology according to an embodiment of the present disclosure may be applied to various types of construction machinery located in areas where no GPS signals are received.

Hereinafter, the construction machinery system using Li-Fi technology according to an embodiment of the present disclosure will be described using an excavator as an example among various types of construction machinery.

The Li-Fi signal reception unit 30 may be placed on an excavator.

The Li-Fi signal reception unit 30 may continuously receive Li-Fi signals or data in one frame unit, transmitted by the LED 23 of the LED module unit 20 over time.

The Li-Fi signal reception unit 30 may be electrically connected to the control unit 50.

The Li-Fi signal reception unit 30 may transmit a received Li-Fi signal to the control unit 50.

The sensor unit 40 may be a sensor for measuring angles.

Specifically, the sensor unit 40 may be an inertial measurement unit (IMU) sensor. The IMU sensor may measure the speed of change, the displacement, etc. for changes in the movements or the position of an object on which a sensor has been mounted. In addition, when the IMU sensor is mounted or placed on a component of a construction machine, e.g., excavator, it may measure the angle of the component. According to an embodiment of the present disclosure, the sensor unit 40 is not limited to an IMU sensor, and other types of sensors for measuring angles can also be used if they can measure the angle of a component of a construction machine, e.g., excavator, on which they are placed.

A plurality of sensor units 40 may be placed on an excavator. For example, the sensor unit 40 may be placed on the body, the boom, the arm, and/or the bucket of an excavator. In FIG. 1, a body IMU sensor 41, a boom IMU sensor 42, an arm IMU sensor 43, and a bucket IMU sensor 44 respectively refer to the sensor units 40 disposed on the body, the boom, the arm, and the bucket of an excavator.

The sensor unit 40 may be electrically connected to the control unit 50.

The sensor unit 40 may transmit a measured sensor value, e.g., angle sensor value, to the control unit 50.

The control unit 50 may receive a Li-Fi signal received by the Li-Fi signal reception unit 30 and a sensor value, e.g., angle sensor value, measured by the sensor unit 40.

The control unit 50 may calculate the location of an excavator by analyzing Li-Fi signals, and may calculate the position of the end of the bucket based on sensor values, e.g., angle sensor values, of the sensor units 40 disposed on the components of the excavator, such as the main body, the boom, the arm, and the bucket. The control unit 50 may transmit the position, i.e. a coordinate value, of the end of the bucket to the display unit 60, which will be described below.

The control unit 50 may use map data input to the control unit 50 and/or the display unit 60. The control unit 50 may control map data, the location of an excavator, and the position of the end of the bucket to be displayed together on the display unit 60.

It may be possible for a user to easily check the progress of the work in real time using map data, the location of an excavator, and the location of the end of the bucket, which are displayed on the display unit 60.

The control unit 50 may calculate the distance between the LED module unit 20 and the Li-Fi signal reception unit 30. When there are a plurality of LED module units 20, the LED module units 20 may be distinguished by their own unique identification marks (ID).

When there are a plurality of LED module units 20, the distance between each LED module unit 20 and each Li-Fi signal reception unit 30 may be calculated in two ways.

First, the distance can be calculated based on pseudo range as follows.

Each LED module unit 20 may transmit the transmission time along with each Li-Fi signal or data in one frame unit, and the control unit 50 may calculate the distance based on the difference between the transmission time and the reception time at the Li-Fi signal reception unit 30. Therefore, each LED module unit 20 and each Li-Fi signal reception unit 30 need to be constantly synchronized in time.

The distance between the LED module unit 20 and the Li-Fi signal reception unit 30 may be expressed as Equation 1 below and calculated by Equation 1.

$$\text{The distance between the LED module unit 20 and the Li-Fi signal reception unit } 30 = (T2 - T1)* \text{ Speed of light} \qquad \text{[Equation 1]}$$

Here, T1 denotes the transmission time at the LED module unit 20, and T2 denotes the reception time at the Li-Fi signal reception unit 30.

Second, the distance can be calculated by measuring the illuminance as follows.

Each LED module unit 20 may transmit the illuminance of the LED module unit 20, specifically, of the LED 23 along with each Li-Fi signal or data in one frame unit. Here, the value of the transmitted illuminance may be the illuminance value of the LED 23 measured at a reference distance (e.g., 1 m).

The control unit 50 may calculate the distance based on the illuminance value transmitted by the LED module unit 20 and the illuminance value at the Li-Fi signal reception unit 30.

The illuminance at the Li-Fi signal reception unit 30 may refer to the illuminance of light measured by a photo diode attached to the Li-Fi signal reception unit 30 when the Li-Fi signal reception unit 30 receives a Li-Fi signal.

The distance between the LED module unit 20 and the Li-Fi signal reception unit 30 may be expressed as Equation 2 below and calculated by Equation 2.

$$\text{The distance between the LED module unit 20 and the Li-Fi signal reception unit } 30 = \sqrt{(\text{input illuminance/measured illuminance})} \qquad \text{[Equation 2]}$$

Here, the input illuminance may refer to the illuminance of the LED 23 measured at a reference distance, e.g., 1 m, and the measured illuminance may refer to the illuminance of light measured by a photo diode attached to the Li-Fi signal reception unit 30.

The control unit 50 may calculate the coordinates of the Li-Fi signal reception unit 30. Here, the coordinates of the Li-Fi signal reception unit 30 may be positioning and GPS coordinates.

First, the control unit 50 may calculate the positioning coordinates of the Li-Fi signal reception unit 30 using triangulation. The positioning coordinates of the Li-Fi signal reception unit 30 may be coordinates for indicating the location of the Li-Fi signal reception unit 30 using the point where the GPS signal reception unit 10 is placed as a reference point.

Specifically, based on the installation or positioning coordinates of the LED module unit 20 and the distance between the LED module unit 20 and the Li-Fi signal reception unit 30, the control unit 50 may calculate the positioning coordinates of the Li-Fi signal reception unit 30 using triangulation. Since the description of the triangulation is well known, it will not be provided here.

The control unit 50 may calculate the GPS coordinates of the Li-Fi signal reception unit 30 by adding the received GPS coordinates of the GPS signal reception unit 10 to the positioning coordinates of the Li-Fi signal reception unit 30.

The GPS coordinates of the Li-Fi signal reception unit 30 may be the $P_1$ vector shown in FIG. 4.

The GPS coordinates of the Li-Fi signal reception unit 30 may indicate the location of the excavator.

In order to calculate the three-dimensional coordinate value of the $P_1$ vector, the Li-Fi signal reception unit 30 may need to receive Li-Fi signals from at least four LED module units 20, and may need data on the unique identification mark (ID) and the installation or positioning coordinates of each LED module unit 20 and the distance between each LED module unit 20 and each Li-Fi signal reception unit 30.

The control unit 50 may calculate the position, i.e., coordinates, of the end of the bucket based on a sensor value, e.g., angle sensor value, measured by the sensor unit 40. The position, i.e., coordinates, of the end of the bucket may be calculated based on the $P_2$, $P_3$, and $P_4$ vectors shown in FIG. 4.

The $P_2$ vector may be the coordinate value of the distance from the GPS coordinates ($P_1$ vector) of the Li-Fi signal reception unit 30 to the ground. The $P_3$ vector may be the coordinate value of the distance from the $P_2$ vector to the connection between the main body of the excavator and the boom thereof, and the connection between the main body of the excavator and the boom thereof may correspond to the point (x,y) in FIG. 5. The $P_4$ vector may be the coordinate value of the distance from the $P_3$ vector to the end of the bucket.

In conclusion, the GPS location or coordinates of the end of the bucket may be the sum of the $P_1$ to $P_4$ vectors.

The $P_2$ vector and the $P_3$ vector may be fixed values that can be obtained based on the design dimensions of an excavator.

The $P_4$ vector may be calculated using the sensor unit 40, that is, the body IMU sensor 41, the boom IMU sensor 42, the arm IMU sensor 43, and the bucket IMU sensor 44, respectively disposed on the body, the boom, the arm, and/or the bucket of an excavator (see FIG. 1). The mathematical equation related thereto is shown in FIG. 5.

The control unit 50 may control map data, the location of an excavator, and the position of the end of the bucket to be displayed together on the display unit 60.

The display unit 60 may display map data, the location of an excavator, and the location of the end of the bucket. The map data may be input into the control unit 50 and/or the display unit 60 by a user.

The display unit 60 may include a monitor and various electrical and electronic equipment for displaying map data, the location of an excavator, the location of the end of the bucket, etc. on the monitor. According to an embodiment of the present disclosure, the display unit 60 may display them as shown in FIG. 6.

Figure 6:
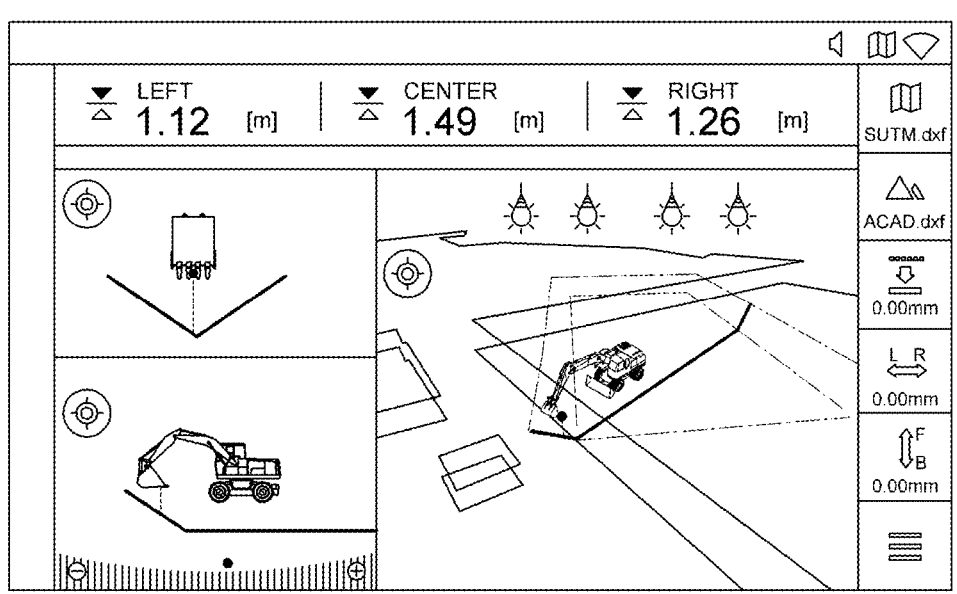
FIG. 6 is a view showing the GPS-based map data and the location of the end of the bucket, displayed by the display unit.

FIG. 6 is a view showing the GPS-based map data and the location of the end of the bucket, displayed by the display unit.

Referring to FIG. 6, the display unit 60 may display map data, an excavator, the location of the excavator, the location of the end of the bucket, a 3D graphic screen, the ground at the work site, the distance between buckets, etc. The map data may contain a kind of drawing of the work to be done by the excavator. Here, the working drawing may include a working drawing of the first location where the GPS signal reception unit 10 is placed and a working drawing of the second location where the LED module unit 20 is placed. The display unit 60 may display the working drawing of the first location and the working drawing of the second location separately so that an area of which the location can be known only by GPS and an area of which the location can be known by GPS and Li-Fi may be distinguished. In addition, the display unit 60 may display a plurality of LED module units.

Through the display unit 60, it may be possible for a user to easily check the working status of an excavator in real time in an area where no GPS signals are received.

In the case of the construction machinery system using Li-Fi technology according to an embodiment of the present disclosure, there is no need for regular surveying, so there is no need for surveyors to stand by at all times and the work time can be shortened.

In addition, in the case of the construction machinery system using Li-Fi technology according to an embodiment of the present disclosure, it may be possible to check the results of work in real time even in areas where no GPS signals are received.

The features, the structures, the effects, etc. described in connection with the embodiments of the present disclosure above are included in at least one embodiment of the present disclosure and are not necessarily limited to only one embodiment. Furthermore, the features, the structures, the effects, etc. described in relation to each embodiment can be carried out by combining or modifying them with respect to other embodiments by a person having ordinary skill in the field to which the embodiments belong. Accordingly, contents related to such combinations and modifications should be construed as being included in the scope of the present disclosure.

Although the description has been made focusing on the embodiments above, the embodiments are only presented as examples and are not intended to limit the present disclosure. In addition, a person having ordinary skill in the field to which the present disclosure pertains would understand that various modifications and applications not described above are possible within the scope of the essential features of the embodiments of the present disclosure. In other words, each component specifically described in relation to the embodiments may be modified. Furthermore, the differences resulting from such modifications and applications should be construed as being included in the scope of the present disclosure as defined in the attached claims.

REFERENCE SIGNS LIST

10 GPS signal reception unit
20 LED module unit
30 Li-Fi signal reception unit
40 sensor unit
50 control unit
60 display unit

What is claimed is:

1. A construction machinery system using Li-Fi technology, comprising:

a GPS signal reception unit disposed at a first location where GPS signals are smoothly received, the GPS signal reception unit receiving GPS signals transmitted from GPS satellites and generating GPS coordinates;

a plurality of LED module units disposed at a second location, separated from the GPS signal reception unit and located in an area where the GPS signals are not received, the LED module units being electrically connected to each other to receive the GPS signals to generate and transmit Li-Fi signals;

a Li-Fi signal reception unit disposed on a construction machine located at the second location and receiving the Li-Fi signals generated by the LED module units;

a plurality of sensor units disposed on respective components of the construction machine, each of the sensor units measuring a rate and an amount of change with respect to posture transformation or positional movement of the respective components of the construction machine, or measuring angles of the respective components; and a control unit calculating the positions of the construction machine and the respective components based on the Li-Fi signals received by the Li-Fi signal reception unit and the measurements of the respective components obtained by the sensor units, wherein each LED module unit further includes an input unit into which the GPS coordinates of the GPS signal reception unit, a unique identification mark (ID) of the LED module unit, positioning coordinates of the LED module unit, illumination information, and time information of the LED module unit are input, wherein the positioning coordinates of the GPS signal reception unit indicate the location of the GPS signal reception unit using the point where the GPS signal reception unit is placed as a reference point, and the positioning coordinates of the LED module unit indicate the location of the LED module unit using the point where the GPS signal reception unit is placed as a reference point.

2. The system of claim 1, wherein the LED module unit includes a Li-Fi signal generator that generates the Li-Fi signals and a light emitting diode (LED) that is electrically connected to the Li-Fi signal generator and transmits the Li-Fi signals.

3. The system of claim 1, wherein the Li-Fi signals are generated in one frame unit, and the one frame unit includes data on the GPS and positioning coordinates of the GPS signal reception unit, the unique identification mark (ID) of the LED module unit, the positioning coordinates of the LED module unit, and the illuminance and the time of the LED module unit.

4. The system of claim 1, wherein the LED module unit includes the LED that transmits the Li-Fi signals, and the LED continuously transmits the Li-Fi signals over time.

5. The system of claim 3, wherein the control unit calculates the positioning coordinates of the Li-Fi signal reception unit based on the positioning coordinates of the LED module unit and the distance between the LED module unit and the Li-Fi signal reception unit, and the positioning coordinates of the Li-Fi signal reception unit are coordinates for indicating the location of the Li-Fi signal reception unit using the point where the GPS signal reception unit is placed as a reference point.

6. The system of claim 5, wherein the control unit calculates the GPS coordinates of the Li-Fi signal reception unit by adding the GPS coordinates of the GPS signal reception unit to the positioning coordinates of the Li-Fi signal reception unit.

7. The system of claim 1, wherein the sensor unit is a sensor for measuring an angle, the construction machine is an excavator, and the sensor unit measures the angles of the main body, the boom, the arm, and the bucket of the excavator.

8. The system of claim 7, wherein the control unit analyzes the Li-Fi signals to calculate the location of the excavator, and calculates the position of the end of the bucket based on sensor values of the sensor unit disposed on the main body, the boom, the arm, and the bucket of the excavator.

9. The system of claim 7, further comprising a display unit that displays the position of the excavator and the position of the end of the bucket.

10. The system of claim 9, wherein the display unit displays the plurality of LED module units.

11. The system of claim 1, further comprising a map data storage unit including a working drawing of the second location.

12. The system of claim 9, further comprising the map data storage unit including the working drawing of the second location, wherein the display unit displays the working drawing.

13. The system of claim 12, wherein the map data storage unit includes a working drawing of the first location, and the display unit separately displays the working drawing of the first location and the working drawing of the second location.

* * * * *